July 22, 1958
C. L. EKSERGIAN
2,844,409
WHEEL MOUNTING MEANS
Filed June 4, 1953
2 Sheets-Sheet 1
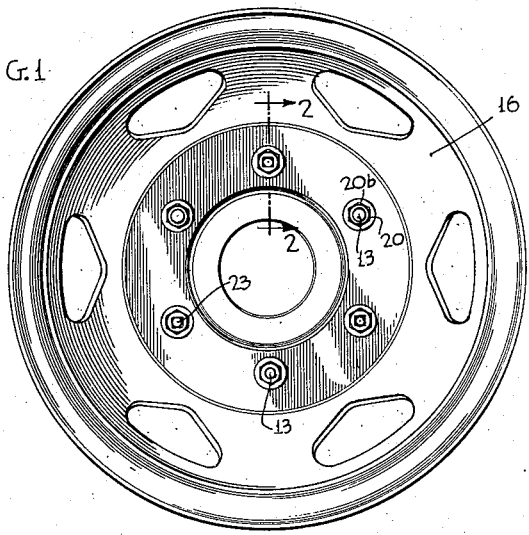
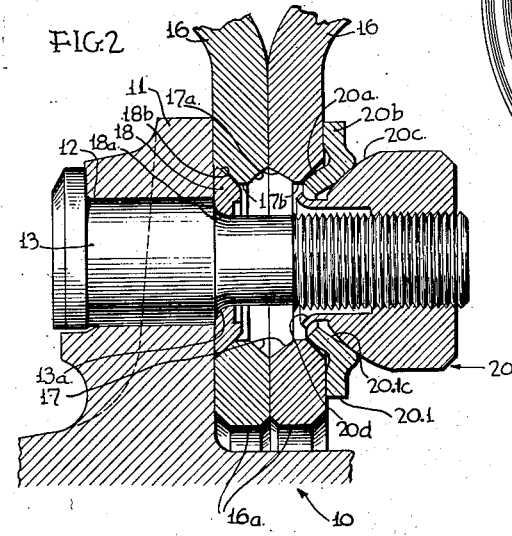
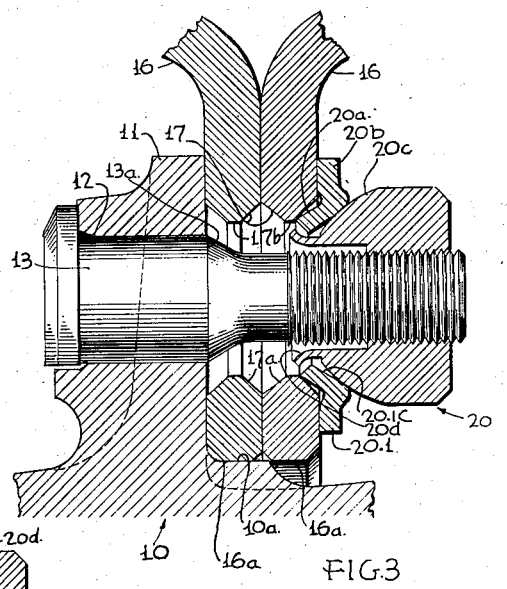
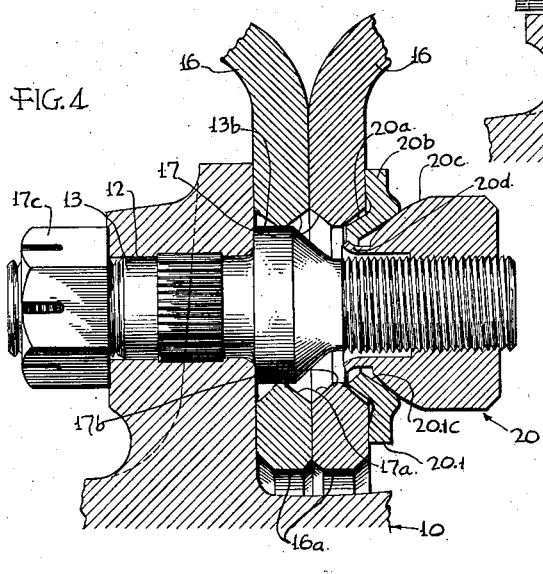
INVENTOR
Carolus L. Eksergian
BY
Maurice A. Crews
ATTORNEY

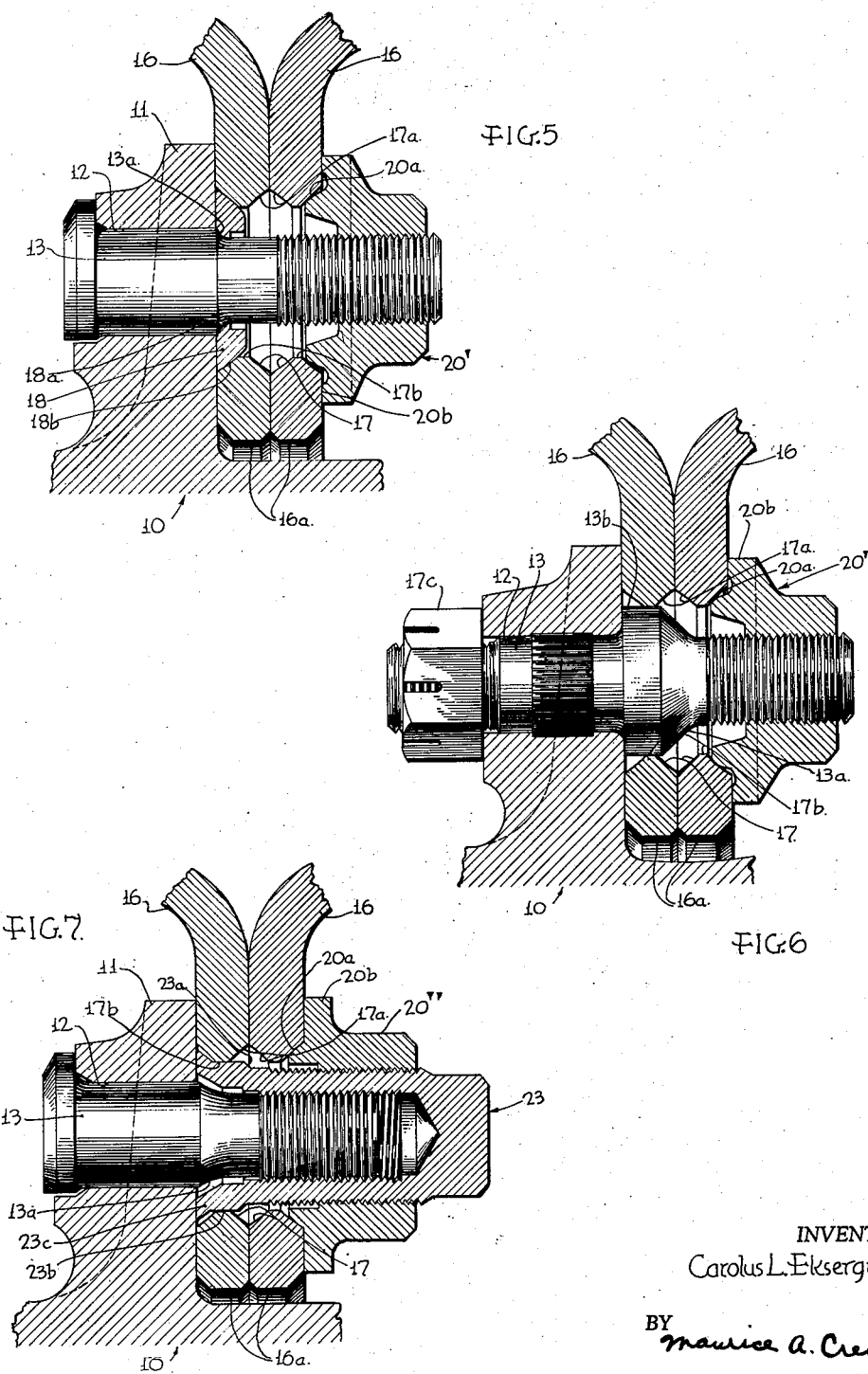

United States Patent Office 2,844,409
Patented July 22, 1958

2,844,409

WHEEL MOUNTING MEANS

Carolus L. Eksergian, Media, Pa., assignor to The Budd Company, Philadelphia, Pa., a corporation of Pennsylvania Application June 4, 1953, Serial No. 359,456

5 Claims. (Cl. 301—36)

This invention relates to wheel mounting means and has for an object the provision of improvements in this art.

One of the particular objects is to provide wheel mounting means which will pilot the wheel body or disk accurately into position on a hub body and at the same time furnish an extensive clamping area and minimum torque requirements for the means provided for clamping the wheel body to the hub.

Another object is to provide wheel mounting means which, though providing accurate positioning or piloting, will not permit the parts to freeze or rust together to such an extent that they are hard to separate when wheels are removed.

Another object is to provide wheel mounting means which is adapted to secure either single or dual wheels on a hub.

Another object is to provide wheel mounting means in which a single nut for each stud bolt serves to secure either single or dual wheels on a hub and in which the nuts in being turned up will cause one or both wheel bodies to be piloted into proper position on the hub.

Another object is to provide wheel mounting means which is adapted to be used as either new or replacement equipment.

Another object is to provide wheel mounting means having inner piloting means which does not require removal when the clamp nuts are removed for the removal of both wheel bodies when duals are used.

Another object is to provide wheel mounting means which will compensate for bent stud bolts or offset stud bolts without lessening the clamping action on the wheel bodies.

The above and other objects and advantages of the present invention will be apparent from the following description of certain exemplary embodiments, reference being made to the accompanying drawings thereof, wherein:

Fig. 1 is an outside elevation of a wheel and hub assembly;

Fig. 2 is an enlarged partial section taken on the line 2—2 of Fig. 1 showing a two-piece adjustable nut and an inner washer piloting means for a dual wheel assembly;

Fig. 3 is a similar section showing the same nut used with a hub pilot for the inner wheel body of a dual wheel assembly;

Fig. 4 is a similar section showing the same nut used with a stud pilot for the inner wheel body of a dual wheel assembly;

Fig. 5 is a similar section of a one-piece flanged piloting nut and an inner piloting washer for a dual wheel assembly;

Fig. 6 is a similar section showing the one-piece nut used with a stud bolt pilot for the inner wheel body of a dual wheel assembly; and Fig. 7 is a similar section showing the one-piece nut used with a flanged cap nut for piloting the inner wheel body of a dual wheel assembly.

The hub body 10 is provided with a flange 11 having an annular series of holes 12 in which are positioned a plurality of stud bolts 13. Preferably the stud bolts are held tightly in the holes so as to form a more or less permanent assembly with the hub.

The inner portion of one or more wheel bodies or disks 16 is provided with holes 17 which receive the stud bolts 13, the holes being oversize relative to the stud bolts in the Fig. 2 form. The holes 17 are formed with countersunk portions 17a on each side and with narrow cylindrical portions 17b between them. This provides that the disks may be mounted with either side inward or outward.

In the Fig. 2 form the inner disk 16 is piloted into proper position on the stud bolts by washers 18 having inner countersunk surfaces 18a fitting on inclined shoulders 13a on the stud bolts and outer tapered surfaces 18b fitting within the countersunk portions 17b of the holes of the disks. Where the threads are of greater diameter than the bolt shank a split washer adapted to spread in passing the threaded portion is used.

The outer disk 16 is piloted into position and clamped by clamping means generally referred to as nuts 20 which screw onto threaded portions of the stud bolts, the nuts having an inclined conical or spherical portion 20a coacting with the countersunk portions 17a of the disk holes and a broad outer flange 20b which bears on the flat surface of the outer face of the disk around the hole therein.

In the Fig. 2 form both the piloting portion and the annular clamping flange portion of the nut are carried on a loose washer 20.1 which has considerable free movement relative to the nut proper as along a concave spherical surface 20.1c coacting with a convex spherical surface 20c of the nut proper. The washer 20.1 is preferably held in loose but permanent assembly with the nut proper, as by a flange 20d which is flared outwardly after the washer is placed thereon.

The form shown in Fig. 3 differs from the Fig. 2 form only in the means provided for piloting the inner wheel body, the means here shown comprising an enlarged cylindrical sided shoulder 10a provided on the hub end at the outer side of the flange 11 which fits closely within the inner opening 16a of the inner wheel disk.

The form shown in Fig. 4 differs from the Fig. 2 form again only in the means provided for piloting the inner wheel body, the means here shown comprising an enlarged cylindrical sided shoulder 13b on a stud bolt which closely fits the cylindrical inner surface 17b of a disk hole 17. In this form the stud bolts are inserted from the front side of the hub flange and are retained by nuts 17c.

In all of the forms shown in Figs. 2 to 4 the clamping means, comprising the loose nut-washer unit, is free to adjust for bent or slightly displaced stud bolts while still providing full clamping action at the outer flange and with enough piloting action to bring the stud bolt end into proper position relative to the hole for this clamping action. As shown in the drawings, the fit at the piloting portion 20a is not a close one and the parts are so formed and proportioned that substantially all of the clamping pressure comes on the outer flange 20b; this flange being quite rigid and in such relationship to the nut that pressure is brought on the flange by the nut in a conical zone the line elements of which make only a small angle with the axis of the bolt and very little spring exists in the flange between the points of applied and clamping pressure. The piloting portion 20a acts only to bring the parts into proper position and unless there is a misadjustment does not take any of the clamping pressure.

In the forms shown in Figs. 5 and 6 the nut 20' is made in one piece instead of in two parts, as in Figs. 2 to 4. This integral nut serves most of the functions of the two-piece nut unit. It pilots and has a broad clamping flange but does not compensate as much for bent or misplaced stud bolts as does the first form.

The assembly shown in Fig. 5 corresponds to that shown in Fig. 2 but uses the one-piece nut 20' instead of the two-piece nut. The same parts are referred to by the same reference characters as before.

The assembly shown in Fig. 6 is the same as that shown in Fig. 4 but uses the one-piece nut 20' instead of the two-piece nut.

The counterpart assembly corresponding to Fig. 3, where one or both of the disks pilot on the hub, has not been shown for the one-piece nut but it is obvious that it may be substituted for the two-piece nut here just as in the other forms.

In the Fig. 7 assembly the inner disk 16 is piloted by the sloping shoulders 23a of a cap nut 23 which is threaded on the stud bolt 13, the cap nut having a cylindrical portion 23b which closely fits within the cylindrical portion 17b of the hole in the wheel disk 16. The cap nut 23 is threaded on its outer surface and the nut 20" is provided with an enlarged threaded hole which screws upon the cap nut. The end of the cap nut is extended in a flared skirt 23c which jams against the hub flange to resist loosening of the cap nuts in use and to provide a definite axial location for their piloting elements.

The Fig. 7 form avoids the use of a loose part, such as the piloting washer 18, and also avoids the need to use a replacement stud bolt, such as that shown in Figs. 4 and 6.

It is to be understood that in all cases the piloting projection of the nut is made enough smaller than the tapered portion of the hole in the wheel disk to avoid clamping at this point, the clamping action being at the flange. However, the position attained through the piloting action is very near to complete accuracy, especially after the clamping action by the flange has been completed.

It is thus seen that the invention provides an improved and convenient piloting and clamping arrangement for wheel disks which is adapted for either new or replacement equipment.

While certain embodiments have been described for purposes of illustration, it is to be understood that there may be other modifications within the general scope of the invention.

What is claimed is:

1. Wheel mounting means comprising in combination, a hub body, an annular series of clamping stud bolts carried by said hub body, piloting means for an inner wheel body on said hub body, inner and outer wheel bodies or disks having holes which are countersunk at each end mounted on said stud bolts, the outer wheel body, at least, having oversized holes receiving said stud bolts, and clamping nut means on said stud bolts, each clamping nut means comprising an inner tapered piloting element entering a hole in the wheel body and a surrounding flat-faced flange element which clamps against a flat-faced portion on the outer surface of the wheel body around the hole, the parts being so formed and proportioned that substantially all of the clamping pressure is exerted from the nut through the flange along lines which do not make a large angle with the bolt axis and with little permissive springiness and that substantially no pressure is exerted through the piloting element in the countersunk bolt hole, the piloting element, when the nut is fully tightened on the flange element, standing clear and free from pressure at the end and at least partly on the sides.

2. Wheel mounting means comprising in combination, a hub body, an annular series of clamping stud bolts carried by said hub body, piloting means for an inner wheel body on said hub body, inner and outer wheel bodies or disks having holes which are countersunk at each end mounted on said stud bolts, the outer wheel body, at least, having oversized holes receiving said stud bolts, and clamping nut means on said stud bolts, each clamping nut means comprising an inner tapered piloting element entering a hole in the wheel body and a surrounding flat-faced flange element which clamps against a flat-faced portion on the outer surface of the wheel body around the hole, the parts being so formed and proportioned that substantially all of the clamping pressure is exerted from the nut through the flange along lines which do not make a large angle with the bolt axis and with little permissive springiness and that substantially no pressure is exerted through the piloting element in the countersunk bolt hole, the piloting element, when the nut is fully tightened on the flange element, standing clear and free from pressure at the end and at least partly on the sides, the inner piloting means comprising tapered washers on said stud bolts fitting in tapered holes in said inner wheel disk, said washers having tapered outer surfaces.

3. Wheel mounting means comprising in combination, a hub body, an annular series of clamping stud bolts carried by said hub body, piloting means for an inner wheel body on said hub body, inner and outer wheel bodies or disks having holes which are countersunk at each end mounted on said stud bolts, the outer wheel body, at least, having oversized holes receiving said stud bolts, and clamping nut means carried on said stud bolts, each clamping nut means comprising an inner tapered piloting element entering a hole in the outer wheel body and a surrounding flat-faced flange element which clamps against a flat-faced portion on the outer surface of the outer wheel body around the hole, the parts being so formed and proportioned that substantially all of the clamping pressure is exerted from the nut through the flange along lines which do not make a large angle with the bolt axis and with little permissive springiness and that substantially no pressure is exerted through the piloting element in the countersunk bolt hole, the piloting element, when the nut is fully tightened on the flange element standing clear and free from pressure at the end and at least partly on the sides, the piloting means for the inner wheel body comprising cap bolts threaded on said stud bolts, said cap bolts each having an enlarged cylindrical portion closely fitting within a hole in said inner wheel disk and a tapered piloting flange behind the inner disk, and the clamping nut means for the outer wheel body being threaded on said cap bolts.

4. Wheel mounting means comprising in combination, a hub body having a radially extending flange, an annular set of stud bolts carried by said flange, a wheel disk having oversized holes positioned on said stud bolts, and clamping nut means on said stud bolts securing the disk on the hub flange, each clamping nut means comprising an inner tapered piloting element which enters a hole to position the disk and an outer flat-faced clamping flange element which engages a flat-faced portion on the outer surface of the disk around the hole, the parts being so formed and proportioned that substantially all of the clamping pressure is exerted from the nut through the flange along lines which do not make a large angle with the bolt axis and with little permissive springiness and that substantially no pressure is exerted through the piloting element in the countersunk bolt hole, the piloting element, when the nut is fully tightened on the flange element, standing clear and free from pressure at the end and at least partly on the sides.

5. Wheel mounting means comprising in combination, a hub body having a radially extending flange, an annular set of stud bolts carried by said flange, a wheel disk having oversize holes positioned on said stud bolts, and clamping nut means on said stud bolts securing the disk on the hub flange, each clamping nut means comprising an inner tapered piloting element which enters a hole to position the disk and an outer flat-faced clamping flange element which engages a flat-faced portion on the outer surface of the disk around the hole, the parts being so formed and proportioned that substantially all of the clamping pressure is exerted from the nut through the flange along lines which do not make a large angle with the bolt axis and with little permissive springiness and that substantially no pressure is exerted through the piloting element in the countersunk bolt hole, the piloting element, when the nut is fully tightened on the flange element, standing clear and free from pressure at the end and at least partly on the sides, said clamping nut means comprising two parts which fit together on a spherical joint, one part being the nut proper and the other part being a washer-like piece carrying the piloting and clamping elements.

References Cited in the file of this patent

UNITED STATES PATENTS

| | | |
|---|---|---|
| 1,721,313 | Nelson | July 16, 1929 |
| 2,161,740 | Eksergian | June 6, 1939 |
| 2,169,047 | Horn | Aug. 8, 1939 |
| 2,336,767 | Ash | Dec. 14, 1943 |
| 2,410,579 | Haag | Nov. 5, 1946 |
| 2,453,512 | Jacobi | Nov. 9, 1948 |
| 2,597,835 | Eksergian | May 20, 1952 |

FOREIGN PATENTS

| | | |
|---|---|---|
| 700,874 | France | Jan. 5, 1931 |